F. MOUSLEY.
POWDER PUFF AND FACE POWDER BOX OR CONTAINER.
APPLICATION FILED FEB. 17, 1920.
1,355,412.  Patented Oct. 12, 1920.
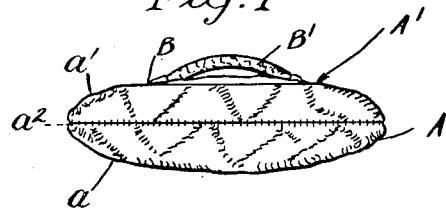
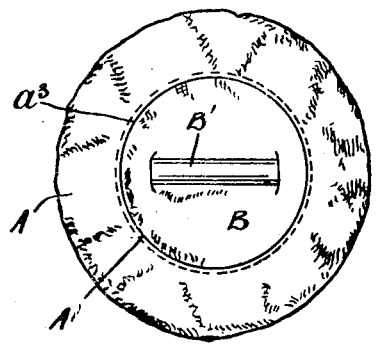
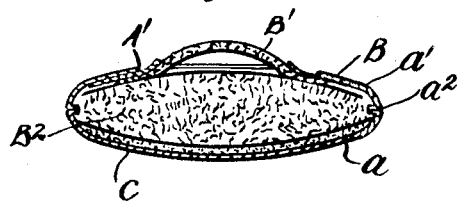

UNITED STATES PATENT OFFICE.

FRANK MOUSLEY, OF MORTLAKE, LONDON, ENGLAND.

POWDER-PUFF AND FACE-POWDER BOX OR CONTAINER.

1,355,412.  Specification of Letters Patent.  Patented Oct. 12, 1920.

Application filed February 17, 1920. Serial No. 359,223.

*To all whom it may concern:*

Be it known that I, FRANK MOUSLEY, a subject of the King of England, residing at Priest Bridge, Mortlake, S. W. 14, in the county of London, England, (whose post-office address is Priest Bridge, Mortlake, S. W. 14,) in the county of London, England, have invented certain new and useful Improvements in and Relating to Powder-Puffs and Face-Powder Boxes or Containers, of which the following is a specification.

This invention which relates to powder puffs and face powder boxes or containers, has for its object to produce an article of this kind which is adapted to be flexed or bent so as to be packed into a pocket or other small compass.

According to this invention the box or container for the face powder and the back of the puff are each made of some soft pliable or flexible material such as rubber or leather.

The box or container is made in the shape of a flat bag with a central aperture or mouth, and the back of the puff is made larger in diameter than the mouth of the container so as entirely to close said mouth when passed therethrough thereby forming an efficient closure to the box or container and preventing escape of powder.

In the accompanying drawings

Figure 1 is a side elevation of my improved powder-puff and powder container;

Fig. 2 is a plan; and

Fig. 3 is a sectional elevation of same.

The box or container A is made of soft pliable or flexible material as a flat bag with a central aperture or mouth A'.

In the form illustrated in the drawings the bag is shown of circular shape in plan with a circular mouth, the body being formed of two pieces of material, a disk-shaped section $a$ and an annular piece $a'$, secured together by a row of stitching along their outer edges as shown at $a^2$. $a^3$ represents a row of stitching around the turned-in edge of the mouth A' to form a neat finish.

The powder-puff comprises a foundation or back B, also made of soft pliable or flexible material, on to which foundation or back the fur, swansdown, or other loose texture puff material $B^2$ is secured in any well-known manner. The back B of the puff is made of the shape of, and slightly larger than, the mouth A' of the container so as completely to close said mouth when the puff is inserted in the container, as shown in Fig. 3. The puff-back B is provided with a loop or other handle B' also made of pliable material by which the puff can be inserted into and withdrawn from the container A.

C in Fig. 3 represents a layer of face powder loose in the bottom of the container, but if desired the powder may be contained in a receptacle placed in the container.

Having fully described my invention what I claim and desire to secure by Letters Patent is:—

1. A combined face-powder container and a powder puff, said container being made of flexible or pliable material in the shape of a flat bag with a central aperture and the said puff having a back made of flexible or pliable material and larger than the aperture in the container and shaped so as entirely to close the aperture or mouth of the powder container when inserted therein.

2. A combined face-powder container and a powder puff, said container being made of flexible or pliable material in the shape of a flat bag with a central aperture, said bag being formed of a disk and an annular piece fastened together, and the said puff having a back made of flexible or pliable material and larger than the aperture in the container and shaped so as entirely to close the aperture or mouth of the powder container when inserted therein.

In testimony whereof I have hereunto set my hand in presence of two subscribing witnesses this 2nd day of February, 1920.

FRANK MOUSLEY.

Witnesses:
 F. W. GOLBY,
 R. L. GOLBY.